(12) United States Patent
Kelly et al.

(10) Patent No.: US 8,396,695 B2
(45) Date of Patent: Mar. 12, 2013

(54) REFERENCE MODEL FOR PRODUCTION PLANTS AND RELATED SYSTEM AND METHOD

(75) Inventors: Jeffrey Dean Kelly, Scarborough (CA); John Mann, Toronto (CA); Matthew G. Burd, Calgary (CA); James Moorhouse, Milford, OH (US)

(73) Assignee: Honeywell International Inc., Morristown, NJ (US)

( * ) Notice: Subject to any disclaimer, the term of this patent is extended or adjusted under 35 U.S.C. 154(b) by 385 days.

(21) Appl. No.: 12/775,365

(22) Filed: May 6, 2010

(65) Prior Publication Data

US 2011/0276160 A1 Nov. 10, 2011

(51) Int. Cl.
*G06F 7/60* (2006.01)
*G06F 17/10* (2006.01)
(52) U.S. Cl. ............... 703/2; 703/1; 703/7; 700/29
(58) Field of Classification Search .............. 703/2
See application file for complete search history.

(56) References Cited

U.S. PATENT DOCUMENTS

| | | | | |
|---|---|---|---|---|
| 4,607,325 A * | 8/1986 | Horn | .............................. | 700/31 |
| 5,305,437 A * | 4/1994 | Fritze et al. | ................... | 345/520 |
| 6,442,512 B1 * | 8/2002 | Sengupta et al. | ................. | 703/6 |
| 6,445,963 B1 * | 9/2002 | Blevins et al. | .................. | 700/44 |
| 6,947,868 B2 * | 9/2005 | Ernst et al. | .................... | 702/176 |
| 6,983,227 B1 * | 1/2006 | Thalhammer-Reyero | ........ | 703/2 |
| 6,983,236 B1 * | 1/2006 | Karlovac et al. | ................. | 703/22 |
| 7,793,850 B1 | 9/2010 | Ho et al. | | |
| 7,877,248 B1 * | 1/2011 | Clune | ............................. | 703/13 |
| 7,904,280 B2 * | 3/2011 | Wood | ................................ | 703/2 |
| 2002/0032495 A1 | 3/2002 | Ozaki | | |
| 2005/0055110 A1 | 3/2005 | Tuszynski | | |

FOREIGN PATENT DOCUMENTS

JP 2004318273 A 11/2004

OTHER PUBLICATIONS

Mirdamadi et al, "Discrete Event Simulation-Based Real-Time Shop Floor Control", in Proc. 21st Eur. Conf. Modeling and Simulation (ECMS 2007) Prague, Czech Republic, 2007.*
Notification of Transmittal of the International Search Report and the Written Opinion of the International Searching Authority, or the Declaration dated Dec. 26, 2011 in connection with International Patent Application No. PCT/US2011/034722.

* cited by examiner

*Primary Examiner* — Mary C Jacob (57) ABSTRACT

Systems and methods that include selecting a physical model and a procedural model associated with an industrial plant, projecting a cross-product of the physical model and the procedural model into a unit-operation association set using a projection matrix, the unit-operation association set associating units representing equipment in the industrial plant and operations representing processes performed in the industrial plant, and establishing internal and external adjacency sets within structures, the internal adjacency set identifying connections between inputs and outputs of individual units and operations, the external adjacency set identifying connections between outputs of some units and operation and inputs of other units and operations. These systems and methods may also include generating a hyperstructure representing the industrial plant using the association and adjacency sets.

18 Claims, 6 Drawing Sheets

REFERENCE MODEL FOR PRODUCTION PLANTS AND RELATED SYSTEM AND METHOD

TECHNICAL FIELD

This disclosure relates generally to production plants and, more specifically, to a reference model for production plants and related system and method.

BACKGROUND

Manufacturing Execution Systems (MESs) are routinely used to plan, schedule, and manage production or other operations in industrial plants. In order to effectively plan, schedule, and manage an industrial plant, one or more models are typically used to provide a description of the plant in both a physical (structural) domain and a procedural (behavioral) domain. Multiple variables that have relationships with a multitude of process elements may be present in both of the domains. However, conventional data models are typically unable to efficiently represent or handle the variables present in both the procedural and physical domains in such a way to efficiently model the industrial plant.

SUMMARY

This disclosure provides a reference model for production plants and related system and method.

In a first embodiment, a methods is disclosed that includes selecting a physical model and a procedural model associated with an industrial plant, projecting a cross-product of the physical model and the procedural model into a unit-operation association set using a projection matrix, the unit-operation association set associating units representing equipment in the industrial plant and operations representing processes performed in the industrial plant, and establishing internal and external adjacency sets within structures, the internal adjacency set identifying connections between inputs and outputs of individual units and operations, the external adjacency set identifying connections between outputs of some units and operation and inputs of other units and operations. This method may also include generating a hyperstructure representing the industrial plant using the association and adjacency sets.

In a second embodiment, a system is disclosed that includes at least one memory configured to store information related to multiple atomic units associated with an industrial process and at least one processing device configured to select a physical model and a procedural model associated with the industrial plant, apply the atomic units to the physical model and the procedural model, project a cross-product of the physical model and the procedural model into a unit-operation association set using a projection matrix, establish internal and external adjacency sets, and generate a hyperstructure representing the industrial plant using the association and adjacency sets. The unit-operation association set associates units representing equipment in the industrial plant and operations representing processes performed in the industrial plant and the internal adjacency set identifies connections between inputs and outputs of individual units and operations. In addition, the external adjacency set identifies connections between outputs of some units and operation and inputs of other units and operations.

In a third embodiment, an apparatus is disclosed that includes at least one input configured to obtain multiple information elements relating to atomic parts of an industrial plant, at least one processing device configured to create a projectional model using the atomic parts based upon physical and procedural characteristics of the industrial plant, and at least one output configured to provide instructions relating to operation of at least one of the atomic parts based upon the projectional model.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

In some embodiments, a software system is contemplated that consists of an extensible data model including concepts of types, templates and attributes. The core model may describe base elements such as units, operations, ports and states. These concepts also include combinations and projections of the base elements. Each of these base elements and concepts may be represented as independent entities in the data model. Each of these entities has attributes that hold or reference information about the entity. In order to meet the varying needs of different applications, industries and customers the attributes are implemented as a meta-model, where the set of attributes that apply to each entity is defined through data-driven configuration. In order to simplify configuration of the model sets of attributes that are required for a given purpose are defined as templates. When a template is associated to an entity it has the correct set of attributes assigned to it. In order to further simplify configuration, entities in the model can be associated with types, which allow the user to classify different instances of an entity type. For example, the base entity type unit could be assigned types such as tank, reactor, shipping dock, etc. Types can in turn be associated with one or more templates, such that when an entity is associated with a type it becomes associated with the related templates and therefore has the correct set of attributes associated with it. Creating an instance of an entity and associating a type with it ensures that assignment of attributes to it is complete and uniform across all instances associated with that type. This further supports industry-specific types and templates where the typical types, templates and attributes used in a given industry for a class of problems can be defined once and re-used in multiple plants.

Figure 1:
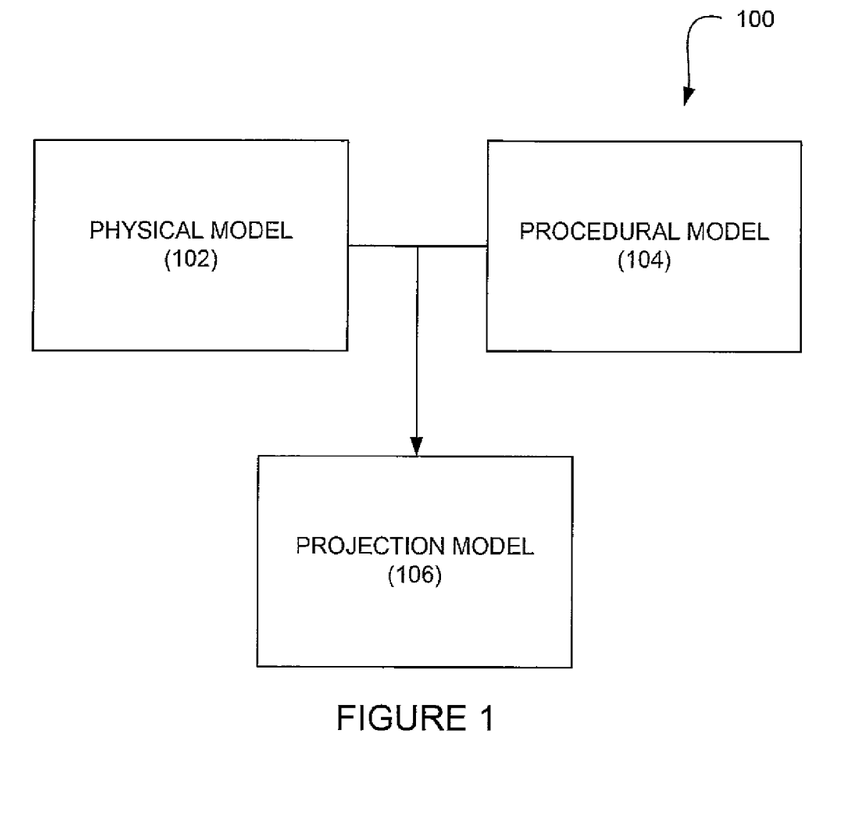
FIG. 1 illustrates an example overview of a reference model for production plants according to this disclosure.

FIG. 1 illustrates an example overview of a reference model 100 for production plants according to this disclosure. In this example, the reference model 100 includes a physical model 102 and a procedural model 104. The physical model 102 includes information related to physical characteristics of a physical plant and is used to describe structural elements within the physical plant. The procedural model 104 describes at least one production or other process and is used to describe the behavioral steps required to perform the at least one process. In some embodiments, the physical model 102 and the procedural model 104 each includes a number of rules and variables, as well as other information, used to create a projection model 106.

One of the innovative elements in the reference model 100 is the projection model 106. A projection is any transformation from one space onto another space. In the context of this disclosure, the physical model 102 (units and ports) and procedural model 104 (operations and states) are projected to create the projection model 106.

In some embodiments, a linear transformed data-table is a projection of the full or original data-table yielding a partial or sub-set relation of the original data-table with no redundancy in the projection. Such a manipulation is useful when it is necessary or desirable to know all of the unique records that involve a sub-set of the columns in the full data-table. In linear algebra, a projection is a linear transformation matrix that is usually idempotent ($\Theta = \Theta^2$, where $\Theta$ is the projection matrix) and that transforms or projects one matrix onto the space of another matrix or hyper-plane. An example of a projection matrix application is found in the field of multivariate statistics, such as in the techniques known as principal component analysis (PCA) and partial least squares (PLS). These techniques project data points onto a latent variable space so as to identify and evaluate underlying or hidden correlation structures within the data. In the area of data reconciliation, projection matrices are used to reformulate an optimization problem into its reduced space form, where only independent unmeasured variables exist.

In some embodiments, projection matrices correspond to set relations, which correlate physical forms with procedural facets of a production or other process, thus projecting a framework from which decisions can be made. This framework eventually translates into what is known as a decision tree, which can be used, for example, in linear or non-linear programming as the mathematical model with decision variables and relationships manifested as constraints.

As noted above, the physical model 102 describes the physical characteristics of a physical plant. These characteristics may include a listing of the equipment of the plant and a topology of the plant, as well as other or additional characteristics of the plant. These characteristics may also include information related to individual equipment, including physical connections of the equipment, electric expectancy of the equipment, a cost of operating the equipment, and an availability of the equipment, as well as any other or additional information relating to the physical characteristics of any equipment within the plant.

The procedural model 104 describes a production or other process. The process can include operations, recipes, or procedures independent of equipment that the process is actually executed with. This procedural model 104 may also include alternatives for performing any particular task. For instance, a given process may call for the drying of a particular material. This drying may be accomplished using different equipment devices. Therefore, the procedural model 104 can list each of the equipment devices that may be used to accomplish the intended process.

The projection model 106 combines the physical and procedural models 102-104 and describes how specific production or other processes are supported by a specific physical plant. The projection model 106 is capable of using information relating to both physical characteristics as described in the physical model 102 and behavioral characteristics described in the procedural model 104. The selections made in the creation of the projection model 106 may be based upon various requirements, such as a requirement to minimize the cost of creating a particular product and/or to minimize the speed of creating a particular product. The projection model 106 can be used to balance competing interests and competing rule sets in order to create a plan of production that satisfies the requirements input into the projection model 106.

The projection model 106 effectively models both the structural and behavioral aspects of complex manufacturing facilities from the perspective of its data using a projectional description of data that combines together the physical (structural) domain with the procedural (behavioral) domain of the problem being solved. The term "projectional" relates to the hierarchical, navigational, or relational models of data. In these embodiments, items that are to be modeled in the physical model 102 and procedural model 104 can be decomposed into atomic elements referred to as units, operations, ports and states (UOPS). Units (physical domain) are typically equipment, and operations (procedural domain) are tasks or activities. Also, ports (physical domain) are the flow interfaces in/out of units, and states (procedural domain) define the substances flowing between the units via the ports, such as stocks, utilities, utensils, time, events and even data.

Once the UOPS elements are defined, association (unit-to-operation assignments), adjacency (unit-to-port attachments), and allowable (unit-to-operation-to-operation allowances) sets can be defined for these atoms or combinations of these atoms. Each element in any of the aforementioned sets can themselves have attached attribute sets relating to quantity, logic, and quality aspects (QLQ). These attribute sets define data necessary to complete the modeling of any type of production or process optimization problem, which ultimately describes the connectivity, capacity, compatibility, and hence the overall capability of the system. Finally, these sets can be used to create individual projectional superstructures and consolidated to form an integrated projectional hyperstructure including any number of superstructures.

Figure 2:
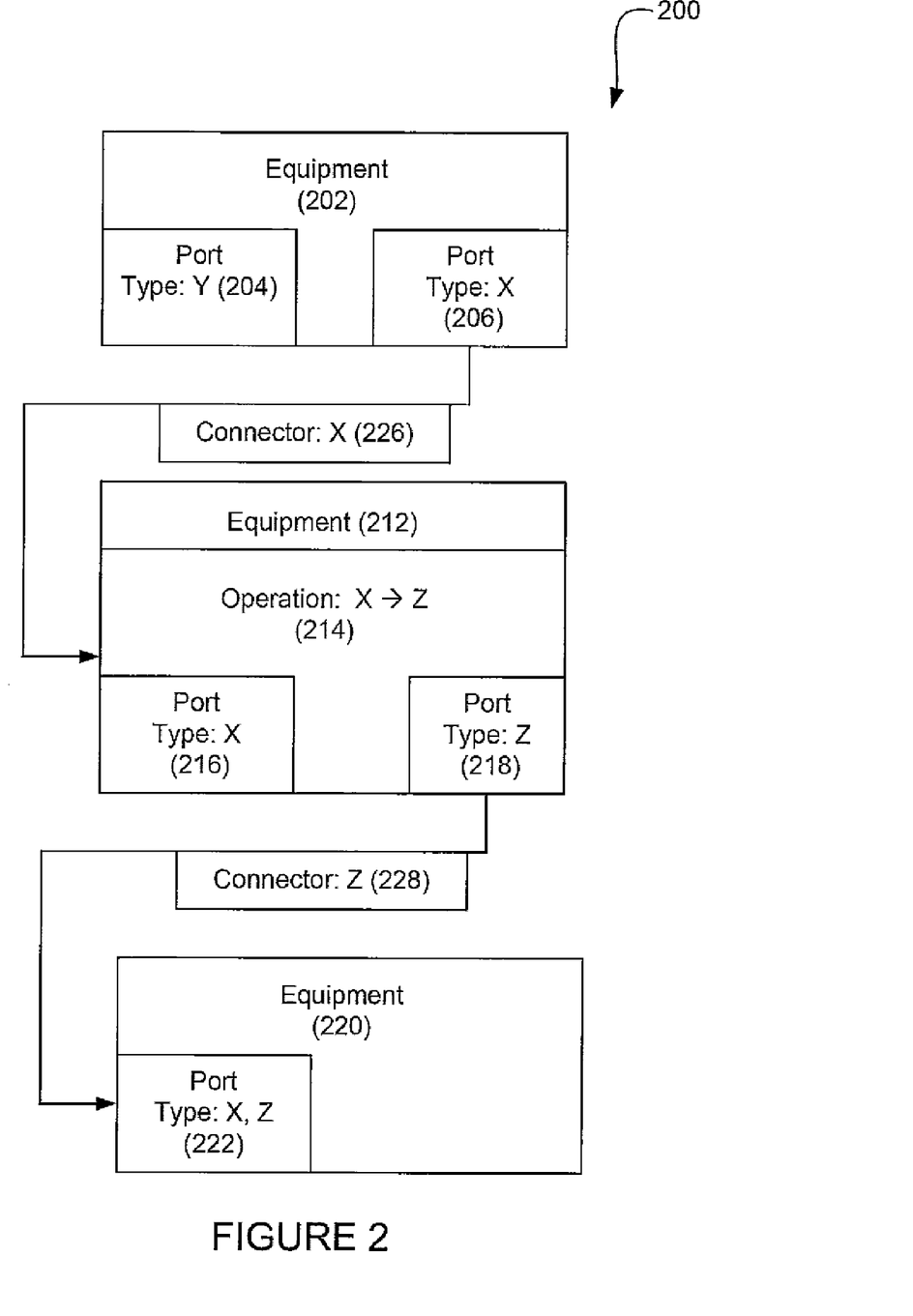
FIG. 2 illustrates an example system with elements that may be used by a reference model as a hyperstructure according to this disclosure.

FIG. 2 illustrates an example system 200 with elements that may be used by a reference model as a hyperstructure according to this disclosure. In particular, the system 200 includes the UOPS discussed above. This system 200 may be a hyperstructure created from available materials and procedures. In this example, the system 200 includes equipment 202, 212, and 220. The equipment 202 includes ports 204 and 206. The equipment 212 includes an operation 214 and ports 216 and 218. The equipment 220 includes port 222. The equipment 202 is connected to the equipment 212 though a connector 226. The equipment 212 is connected to the equipment 220 through a connector 228.

The equipment 202 has a type Y input port 204 and a type X output port 206. The equipment 202 may be connected to any device having a type Y or type X port. While some ports shown in FIG. 2 include a single port type, multiple port types may be associated with each port. A port type may relate to any information, including the size, style of connection, or any other or additional information related to a port that is located on or otherwise associated with a piece of equipment.

The equipment 212 has a type X input port 216 and a type Z output port 218. The equipment 212 is further capable of performing the operation 214, which is designated as transforming element X into element Z. The equipment 220 includes port 222, which may be used for storage of type X or Z elements.

In this example, FIG. 2 is a representation of a simplified plant. One problem inherent in modeling these types of plants is their numerous inputs and outputs, types of machines and equipment, and types of operations. For instance, a single piece of equipment performs a single operation in FIG. 2. However, in most situations, multiple pieces of equipment are capable of performing multiple tasks. As the number of operations and equipment increases, there are often an exponential number of permutations for possible combinations of equipment within a given plant. While each combination may achieve a given goal, a combination is not necessarily optimized for a given set of boundary conditions. Boundary conditions may refer to any type of production or processing consideration, such as cost, efficiency, materials required, equipment required, or other or additional considerations. These boundary considerations may be procedural and/or physical in nature.

A projection model (such as 106) can be used to determine which combination is optimal for a given set of conditions. Each element within FIG. 2 can contain certain qualities defined in either the procedural domain or the physical domain. By defining each element in terms of their behavioral or physical characteristics, a physical and procedural model may be made. These models may lead to a projection model that illustrates the optimal way to perform a particular task given certain boundary conditions.

Each of the models 102-106 may be built using a navigational model. The navigational atoms can include UOPS components, as well as an anthology of attributes, traits or characteristics into QLQ where time attributes or details are included in logic or can be exposed separately as quanta similar to a "quantity of time." A term that can be used to collectively describe the QLQ attributes is "qualogistics." The individual atoms or combination of atoms can have any number of attributes, and these attributes (referenced in both space and time) constitute what is known as "data," where meta-data are the references or indices of the UOPS.

The navigational model provides a spatial representation in a flow sheet, graph or picture. Usually the physical (structural) domain of the plant is conveyed using a piping and instrumentation diagram (P&ID), while the procedural (behavioral or functional) domain of the process is articulated using a process flow diagram (PFD) or a block flow diagram (BFD) in continuous processes and through a recipe network. Viewing data from its relational or even dimensional standpoint can be challenging, especially for the non-programmer or users who are not intimately familiar with structured querying language scripts or macros. For instance, when an operator running an area of an oil refinery needs to find a particular flow, temperature or pressure process value, he or she may use a series of related pictures called screens or graphics as a navigation tool by using mouse-clicks and/or finger-points.

Another strength is that the navigational model of data can have virtually zero redundancy of data. One common limitation of relational databases is that careful attention to normalizing, orthogonalizing or canonicalizing the database is required. This means that in order to minimize the relatively high probability of data redundancy in relational databases (i.e., duplication of data), the principle of parsimony be instituted; otherwise, data corruption and integrity issues may arise during the lifetime of the data in the database. Several types of normal forms are discussed in literature, but there is no real procedure to automatically restructure a collection and coordination of data tables. An example of automatic restructuring is the pre-solve or pre-processing feature of commercial linear programs (LP). This feature compresses an original LP matrix into a smaller but equivalent one that is easier to solve. By virtue of the graphical positioning of data in a navigational model, redundancy can be avoided because there is only one position in space and time with which to catalog, collect and collate the data.

Constructs relating to equipment may include the equipment itself, equipment ports, commit operations, and equipment operation port resources. The equipment itself relates to entry, receipt, delivery, processing or storage of materials. Equipment ports relate to physical asset locations on equipment or materials/resources that are consumed, processed, or produced. Equipment operation relates to the ability of a given piece of equipment to perform a given operation. An equipment operation port resource relates to the ability of a given piece of equipment to consume, process, or produce a given operation resource.

Physical connections represent physically possible connections between equipment ports of different equipment to create a physical flow network. Operations relate to a production or processing activity that can be performed, such as mixing, splitting, shipping, or performing another activity on a given material. These may further include different recipes or procedures for operations performed on specific materials.

The projection model 106 may use common existence, entry/exit, and extremity elements in both the physical model 102 and the procedural model 104. For the purpose of clarity, these three elements are discussed below.

The phrase "common existence" indicates that physical and procedural elements of each element in the system should exist. If there are structural parts, there should also be corresponding behavioral parts where one cannot exist without the other. This defines the associations or combinations of units-to-operations and vice versa, as well as ports-to-states. The correspondence between physical and procedural elements is also the defining notion in the use of the term projectional, which is a sub-set of the cross product of physical X procedural.

The phrase "entry/exit" indicates that each of the physical and procedural elements alone should have explicit and unambiguous inputs and outputs. These are called inlet and outlet ports for physical units and inlet and outlet states for procedural operations. This defines internal adjacency or connection of inputs and outputs attached to units, operations or unit-operations.

The term "extremity" indicates that only physical/procedural inlets and outlet ports/states can be connected to other physical/procedural inlets and outlet ports/states. The physical network of unit-ports to other unit-ports is similar to the P&ID, whereas the network of procedural operation-states to other operation-states is similar to the PFD, BFD or S88 recipe networks. This defines the external adjacency or connection of outputs attached to units, operations or unit-operations to inputs on other units, operations or unit-operations.

The existence requirement says that there should be a correspondence between the physical and procedural core entities. The entry/exit requirement implies that each of the core entities should have connected inlet and outlet ports if a physical unit and inlet and outlet states if a procedural operation. In addition, the extremity requirement forms the network as an all-physical or all-procedural configuration and later the all-projectional superstructure of the system, which is the projected configuration involving combinations and connections of physical and procedural entities.

The creation or realization of the projectional superstructure may involve the cross-product of the physical network with the procedural network. The definition of the projectional superstructure may be defined with the first being, of course, the core atomic elements or atoms to follow. For any given superstructure s, there is an atomic set $U_s$ of size or cardinality nun physical units, which represents all equipment in the system. This physical set $U_s$ is given by Equation 1:

$$U_s = \{u_{1,s}, u_{2,s}, \ldots, u_{nun,s}\}. \quad \text{[EQN. 1]}$$

Each physical unit can have one or more operations, tasks or instructions associated with it. For example, a particular reactor physical unit R may perform RX1 (operation 1) or RX2 (operation 2). The atomic set of all possible operations nop in the system is given by the procedural set $O_s$ shown by Equation 2:

$$O_s = \{o_{1,s}, o_{2,s}, \ldots, o_{nop,s}\}. \quad \text{[EQN. 2]}$$

Inlet and outlet ports correspond to the physical interfaces, boundaries or actual nozzles on the physical unit through which a substance or information can flow into or out of. The atomic set of all physical ports npo in a superstructure s is represented by the physical set $P_s$ shown by Equation 3:

$$P_s = \{p_{1,s}, p_{2,s}, \ldots, p_{npo,s}\} \quad \text{[EQN. 3]}$$

The concept of states is intended to define the nature of any type of substance, including information that can flow through the inlet and outlet ports. There can be at least six different types of states: stocks, utensils, utilities, time, events and data. Stock-states may be the most natural ones for chemical engineers since they represent typically non-renewable resources such as solids, liquids, vapors and gases. Utensil-states take into account renewable resources such as tools (i.e., number of tools needed to support a certain unit), labor (i.e., number of operators needed to operate a unit), and sometimes catalysts.

Utility-states such as steam, electrical power, instrument air and cooling water are a combination of stock-states and utensil-states in that a certain amount of utility-state should be used once a unit starts up, shuts down or switches over (fixed, similar to utensil-states) and the need for the utility may increase proportionately with the processing capacity of the unit (variable, similar to stock-states). The utilities flowing through utility-states are sometimes referred to as doubly-constrained resources since they act like both non-renewable and renewable resources.

Time-states are quite unique since they may be used to formulate continuous-time models where the time on the outlet state minus the time on the inlet state equals the time duration with inside the unit or unit-operation. The event states and data states are included to highlight the notion that states can be diverse, where event states can include set ups, start ups and shut downs and data-states can include workflow information. The set of all states nst in a superstructure s is represented by the procedural atomic set $S_s$ as shown by Equation 4:

$$S_s = \{s_{1,s}, s_{2,s}, \ldots, s_{nst,s}\}. \quad \text{[EQN. 4]}$$

Each element within these atomic sets $U_s$, $O_s$, $P_s$ and $S_s$ may be assigned one or more QLQ attributes. For example, a physical unit called tank belonging to the atomic set $U_s$ may have a maximum holdup or inventory quantity above which it overflows irrespective of which material-service (belonging to the atomic set $O_s$) the tank is currently performing or supporting. In batch process industries, the operation "RXA" belonging to $O_s$ may have fixed duration irrespective of which physical equipment or unit this operation is being executed in.

Several relations can be defined over the physical and procedural atomic sets $U_s$, $O_s$, $P_s$ and $S_s$ as described below. In any given superstructure s, the physical units should be associated with their respective operations if and only if there is a valid relation. The projectional set relation $UO_s$, also referred to as an association set, is represented as Equation [5]:

$$UO_s \subseteq U_s \times O_s. \quad \text{[EQN. 5]}$$

In this equation, $UO_s \subseteq U_s \times O_s$ indicates that the relation or projectional set of unit-operation associations $UO_s$ is a subset of the cross-product between all physical units and all procedural operations $U_s \times O_s$. The above equation represents the approach used in ordinary set theory to express the relation over the two sets $U_s$ and $O_s$. However, this representation is still vague in that it does not expose the projection or mapping from the full cross-product $U_s \times O_s$ to the association set relation $UO_s$. In order to convey this projection explicitly, the above equation can be re-written as Equation 6:

$$UO_s = \text{proj}_{UOs}(U_s \times O_s) = \text{diag}(\Theta_{Us}) \otimes (U_s \times O_s) \quad \text{[EQN. 6]}$$

where $\text{proj}_{UOs}(U_s \times O_s)$ is the projection of $U_s \times O_s$ onto $UO_s$, $\otimes$ is a Hadamard product, and $\Theta_{Us}$ is a projection matrix that projects $U_s \times O_s$ space onto $UO_s$ space. The projection matrix is composed usually of binary zero or one elements that indicate which elements of the cross-product $U_s \times O_s$ belong to the association set relation $UO_s$. If the integrality of all elements of $\Theta_{Us}$ is enforced (i.e., all elements of $\Theta_{Us}$ are required to have values of zero or one), the projectional association set $UO_s$ is said to be crisp, similar to all sets in ordinary set theory. If integrality of its elements is not enforced, then $UO_s$ can be considered fuzzy, where the projectional matrix $\Theta_{Os}$ is equivalent to the membership function found in fuzzy set theory. For the purpose of clarity only, it is assumed that all elements of $\Theta_{Us}$ are zero or one and consequently that all sets are crisp.

In a similar fashion to physical units, each physical port is associated with a procedural state in order to establish the nature of the information that is flowing through the port. This association set relation is denoted $PS_s$ and can be defined as Equation 7 or 8:

$$PS_s \subseteq P_s \times S_s \quad \text{[EQN. 7]}$$

$$PS_s = \text{proj}_{PSs}(P_s \times S_s) = \text{diag}(\Theta_{PSs}) \otimes (P_s \times S_s). \quad \text{[EQN. 8]}$$

Each element within the association sets $UO_s$ and $PS_s$ may be assigned one or more attributes or attribute sets. For instance, a tank may be required to be in running-gauge (flow in and out simultaneously) when it is in one operation but should be in standing-gauge (sequential flow in or out) for a different operation. This is an instance of an operation-dependent logic attribute on a unit.

After defining the projectional association sets $UO_s$ and $PS_s$, other relations could be defined in order to link the unit-operation associations to their set of port-stock associations. From a flowsheet or graphical perspective, the resulting adjacency set relation $UOPS_s$ represents the internal flow of states between the units in a particular operation and their respective ports for the case of outlet ports. For inlet ports, an equivalent adjacency set relation is denoted as $SPOU_s$ where both can be written using the concept of a projection matrix as Equation 9 or 10:

$$UOPS_s = \text{proj}_{UOPSs}(UO_s \times PS_s) = \text{diag}(\Theta_{UOPSs}) \otimes (UO_s \times PS_s) \subseteq UO_s \times PS_s \quad \text{[EQN. 9]}$$

$$SPOU_s = \text{proj}_{SPOUs}(SP_s \times OU_s) = \text{diag}(\Theta_{SPOUs}) \otimes (SP_s \times OU_s) \subseteq SP_s \times OU_s. \quad \text{[EQN. 10]}$$

It should be noted that any of the above internal adjacent sets and the below external adjacency sets can also have any number of and type of quantity, logic, and quality attributes defined.

In order to complete the definition of the superstructure, the external adjacency set relation between any two elements of $UOPS_s$ and $SPOU_s$ may be required. This adjacency set corresponds to the external flow of states across different unit-operation-port states and can be described again by the following projectional set relation shown in Equation 11:

$$UOPSSPOU_s = \text{proj}_{UOPSs}(UOPS_s \times SPOU_s) = \text{diag}(\Theta_{UPSSPUs}) \otimes (UOPS_s \times SPOU_s) \subseteq UOPS_s \times SPOU_s \quad \text{[EQN. 11]}$$

The adjacency set elements or connections between unit-operations and port-states and the elements across different unit-operation-port-states may have any number of attributes attached as mentioned previously. There is in fact a third type of projection used for the compatibility of transitioning from one operation to another operation on a unit in a sequence-dependent changeover called the allowable set.

The use of the association and adjacency-set projection matrices ($\Theta$) to define relations enables these relations to be explicitly visualized via the projection matrices instead of being defined in an almost textual manner through the use of structured queries or relational calculus as in relational databases. Additionally, the association and adjacency-set relations can be externalized and manipulated by the user or analyst directly through the projection matrices, instead of being embedded in the database management system that needs expert database manipulations. An added benefit of the explicit management of the relations is evident during the design stage of a superstructure. At this stage, different relation scenarios can be evaluated by simply switching a relation on or off (i.e., setting the corresponding elements in $\Theta$ to one or to zero, respectively) or even including them in a mixed-integer linear programming (MILE) branch-and-bound search.

In essence, every superstructure is composed of atomic sets $U_s$, $O_s$, $P_s$, $S_s$ that correspond loosely to entities in what is known as the "role data-model". Apart from being connected with its adjacency sets, each atomic set is associated with a set of application-dependent attributes. For example, in the case of scheduling models, these attributes correspond to QLQ-related parameters, while for process simulation purposes these attributes are parameters associated with the material, energy and momentum balance equations and can include pure and pseudo-component thermodynamic, reaction kinetic, and transport phenomena properties. Each physical part or unit should be associated with its role or procedural purpose or use, thus creating the combination or association sets $UO_s$, $PS_s$ ($SP_s$ and $OU_s$). The so-called entity-roles are then linked through relationships that are defined through the connection of adjacency sets $UOPS_s$, $SPOU_s$, $UOPSSPOU_s$. This then completes the existence, entry/exit and extremity requirements for a projectional model 106, which refer to the association sets, internal adjacency sets, and external adjacency sets, respectively.

Once all of the projectional superstructures in the system have been defined, the projectional hyperstructure can then be established, which is simply a consolidation of all of the superstructure A-sets to form hypothetically a just-in-time version of an enterprise-wide problem instance. The physical, procedural and projectional sets can be consolidated by the use of the set union operator from ordinary set theory. The union operation implies that any redundancies (i.e., duplicate elements) across the multiple superstructures are automatically managed by the hyperstructure definition. However, it may be important that the indexing or identity of the redundancies or overlaps be retained in order to properly reconstitute the solution of the enterprise-wide optimization problem into the original superstructures.

The A-sets of the hyperstructure are defined as unions of A-sets of the constituent superstructures. The hyperstructure A-sets can be seen in the following equations, including core or atomic-set unions in Equations 12-15:

$$U_h = U_{s=1} \cup U_{s=2} \cup \ldots \cup U_{s=ns} \quad \text{[EQN. 12]}$$

$$O_h = O_{s=1} \cup O_{s=2} \cup \ldots \cup O_{s=ns} \quad \text{[EQN. 13]}$$

$$P_h = P_{s=1} \cup P_{s=2} \cup \ldots \cup P_{s=ns} \quad \text{[EQN. 14]}$$

$$S_h = S_{s=1} \cup S_{s=2} \cup \ldots \cup S_{s=ns}. \quad \text{[EQN. 15]}$$

Combination or association-set unions are shown in Equations 16 and 17:

$$UO_h = UO_{s=1} \cup UO_{s=2} \cup \ldots \cup UO_{s=ns} \quad \text{[EQN. 16]}$$

$$PS_h = PS_{s=1} \cup PS_{s=2} \cup \ldots \cup PS_{s=ns}. \quad \text{[EQN. 17]}$$

Internal connection or adjacency-set unions are shown in Equations 18 and 19:

$$UOPS_h = UOPS_{s=1} \cup UOPS_{s=2} \cup \ldots \cup UOPS_{s=ns} \quad \text{[EQN. 18]}$$

$$SPOU_h = SPOU_{s=1} \cup SPOU_{s=2} \cup \ldots \cup SPOU_{s=ns} \quad \text{[EQN. 19]}$$

External connection or adjacency-set unions are shown in Equation 20:

$$UOPSSPOU_h = UOPSSPOU_{s=1} \cup UOPSSPOU_{s=2} \cup \ldots \cup UOPSSPOU_{s=ns} \quad \text{[EQN. 20]}$$

It is understood that there are many uses of superstructure creation and hyperstructure consolidation. The first is the advantage of being able to systematically consolidate multiple superstructures into a single hyperstructure, which provides the ability to automatically and accurately manage distributed and decentralized systems. Divisionalized, distributed and/or decentralized members or business lines exist in any enterprise for various reasons, such as security, support, storage, and speed.

In any given system, there may be private constraints that cannot be shared across multiple superstructures. This may be the case when different companies at arms-length within a corporation or group are involved, or in the case of a supply-chain with outsourcing where the chinks of the chain are entirely separate companies.

The ability to support and maintain a centralized or monolithic superstructure may be too large and/or unwieldy to make all of the decisions centrally in one optimization problem. Also, certain superstructures may contain so many decision variables and constraints that it is impossible to store them in computer memory from which to solve the single optimization problem. There even exist large and complex superstructures that cannot be solved in reasonable computational time, even though they can be modeled and stored in memory. In these situations, decomposition may be an option to reduce the time for obtaining good (feasible) solutions. In addition to those reasons, there may also be issues related to ownership and obsolescence that make decomposition of a system preferred.

For instance, the owners of the system are usually more interested in its success than non-owners for self interest reasons. By decomposing a system into smaller partitions that can be more intimately managed and maintained (usually in a hierarchy) by the individual data owners themselves, this means that the overall system may tend to be inherently better managed and maintained.

Moreover, it is often easier to repair or replace defective components, modules or sub-sections of a system rather than the entire system itself. This is known as the "first innovation in manufacturing" (i.e., interchangeable parts). This is of particular importance in systems where components become out-of-date quickly.

The automatic consolidation of a hyperstructure is of particular interest for distributed systems since only the individual superstructures may need to be maintained on a regular cycle basis by usually well-defined owners or stakeholders. An important example of such a distributed system is in the case of hierarchical planning and scheduling optimization models. For example, if only scheduling models are created manually and maintained, then it seems very reasonable that the overall planning model (i.e., hyperstructure) should be generated automatically by simply reducing, relaxing or restricting the complexity of the detailed constituent superstructure scheduling models. Given that the only real difference between planning and scheduling problems is the interpretation of time or what can be called the time-period discipline, then only scheduling models from which just-in-time planning models are generated can be developed and deployed. In planning, multiple unit-operations can occur simultaneously within the same time-period or interval, however only one unit-operation might be active in any time-period in scheduling in order to respect what is known as the single-use, unary or cardinality resource constraint. This timing difference is also known as big-buckets versus small-buckets of time.

Hyperstructure consolidation can also be viewed as a new and enhanced production modeling paradigm. In the same way that base+delta models are used to incrementally or successively approximate non-linear functions as separable functions in non-linear programming, a base+delta or recursive modeling approach may be applied to the design stage of model building, yielding an incremental model-development/deployment methodology. Since each superstructure in an enterprise-wide system may be fairly large in itself (e.g. a complex and integrated oil refinery), it may be beneficial from a complexity management perspective to generate it in moderate and methodical increments. A few elements of the superstructure can be initially configured until it is deemed to be performing adequately and accurately. Then additional elements or details can be defined as delta superstructures, which may be augmented in a piece-wise fashion to the base superstructure through the application of the hyperstructure consolidation technique.

After consolidation, the updated superstructure will contain all elements from both the base and delta superstructures, which becomes of course the new base superstructure for the next round of model-building. This also supports the idea of intelligent problem solving since it is easier to detect and diagnosis problems in small increments than it is in a very large instance. Additionally, the recursive or base+delta concept can be extended to institute a coordinated and collaborative multi-user modeling environment in which many users or consultants can model different sections of a system simultaneously, and then all of the distributed superstructures can be automatically consolidated into the final enterprise-wide hyperstructure.

A symmetric idea to the incremental model-building methodology is the incremental model-breaking technique, which may be used for isolating problems in large super or hyperstructures. The set difference operator (instead of the set union or addition operator) can be used to sequentially remove details from an existing superstructure in order to identify the source of problem inconsistencies or infeasibilities. The elements to be removed are configured in a delta superstructure to be used in this base-delta or reverse-recursive modeling approach. Since the projection matrices define the superstructure given the full cross-products, this removal or deletion technique may be automated by declaring the binary 0/1. Elements of the projection matrices $\Theta$ can be viewed as binary decision variables in a MILP branch-and-bound optimization search, similar to the idea of using MILP to systematically search for the most promising process control structure designs based on a pre-defined selection criterion.

The fact that both model-building and model-breaking can be managed through the proposed projectional model of data constructs is useful since it accounts for the three basic relational database rules previously mentioned of insert or realize, delete or remove, and update or replace/reset. Consequently, the use of the projectional data model for superstructure creation and hyperstructure consolidation is not conditional on the existence of an underlying relational database to provide a storage and retrieval system. In fact, simple data files can be used to provide recursive access to the A-sets with their accompanying attribute sets so that persistent storage and fast retrieval of all of the aspects of the enterprise-wide optimization models can be afforded.

Furthermore, these delta superstructures are also very useful for performing scenario analyses on a given base superstructure. For example, a facility location problem with many different scenarios corresponding to the different location options can be evaluated orderly. In this case, each scenario can easily correspond to a different delta superstructure. The advantage of having multiple delta superstructures is that each scenario can be very easily managed and maintained. Once a scenario is chosen, the hyperstructure can be consolidated just-in-time and could potentially become the next base superstructure for other future scenario evaluations. A similar technique can be used for keeping a history or log of previous model modifications. If the modifications are made through delta superstructures, it is very straightforward to keep a record of the changes, thus enabling an undo or retrocede problem modification feature.

One application of the projectional model may be in a multipurpose batch plant that includes a system with four storage tanks, two reactors, a heater and a still. The reactors may be in one of three different reaction mode-operations, namely Reaction 1, Reaction 2 or Reaction 3 (but not at the same time). This illustrative example is directed at showing how a superstructure is built, as well as indicating how two or more superstructures can be combined together to form a hyperstructure. This scheduling problem is assumed to be composed of two superstructures S1 and S2 that contain the same physical view. The superstructures differ in the modes of operation assigned to Reactors 1 and 2. In S1, Reactors 1 and 2 are assigned two modes of operation: Reaction 1 and Reaction 2. In S2, these Reactors only contain one mode of operation: Reaction 3.

The first step in building a superstructure is to project the cross-product $U_{S1} \times O_{S1}$ into the unit-operation association set $UO_{S1}$ by using the projection matrix $\Theta_{UOS1}$. After the association sets $UO_S$ and $PS_S$ have been defined, the internal and external adjacency-sets can be established. The first type of adjacency-set that can be defined is the one that refers to the internal connections between a unit-operation with its respective port-stocks (i.e., the lines without arrows between a unit-operation and the small square elements (port-stocks)). By using the projectional model, the full cross-product $UO_{S1} \times PS_{S1}$ is multiplied by the projection matrix $\Theta_{UOPSS1}$ to generate the internal adjacency-set $UOPS_{S1}$.

In order to simply demonstrate the generation of hyperstructure H, only one association set and one adjacency set will be shown. The hyperstructure association and adjacency sets can be obtained by using one of two different methods. The first method includes performing the set union operator on the atomic sets $U_{S1}$ and $U_{S2}$ in order to obtain $U_H$ and proceed similarly with the atomic sets $O_{S1}$ and $O_{S2}$ in order to obtain $O_H$. Then, given the new atomic sets $U_H$ and $O_H$, the generation of the hyperstructure proceeds as if the hyperstructure is a (larger) superstructure (i.e., by using the projection matrix $\Theta_{UOH}$) to establish the elements of the full cross-product $U_H \times O_H$ that belong to the hyperstructure. The second approach is to perform the set union operator on the association and/or adjacency sets directly.

Note that the hyperstructure can contain all of the physical and procedural information of the original problem (i.e., it contains all of the physical units and ports as well as all of the procedural operations and states, respectively). In addition, it is clear that by applying the union operator to the external adjacency sets in superstructures S1 and S2, the full (albeit limited) connectivity information of the original problem is successfully generated.

Using the A-sets of UOPS, it is now possible to model any type of complex and difficult manufacturing problem of any size and scope. The ability to affix any type of attribute onto any of the atomic, association, adjacency and allowable sets provides the necessary flexibility and functionality to formulate any type of problem, including problems that are not necessarily optimization or production related. Whenever there are problems with physical objects that should perform procedural obligations where they consume, produce and/or are supported by diverse resources flowing in and out, the UOPS superstructure and QLQ paradigm may be applied.

Figure 3:
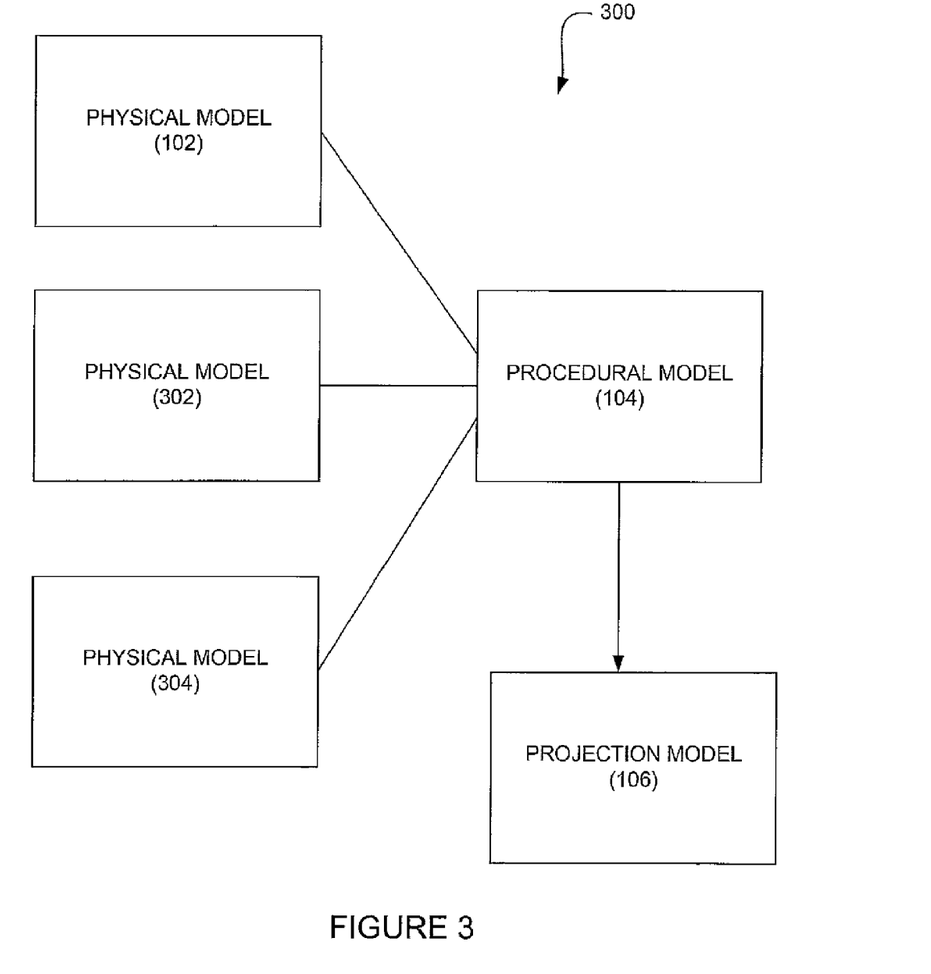
FIG. 3 illustrates an example reference model for production plants that uses multiple physical models according to this disclosure.
Figure 4:
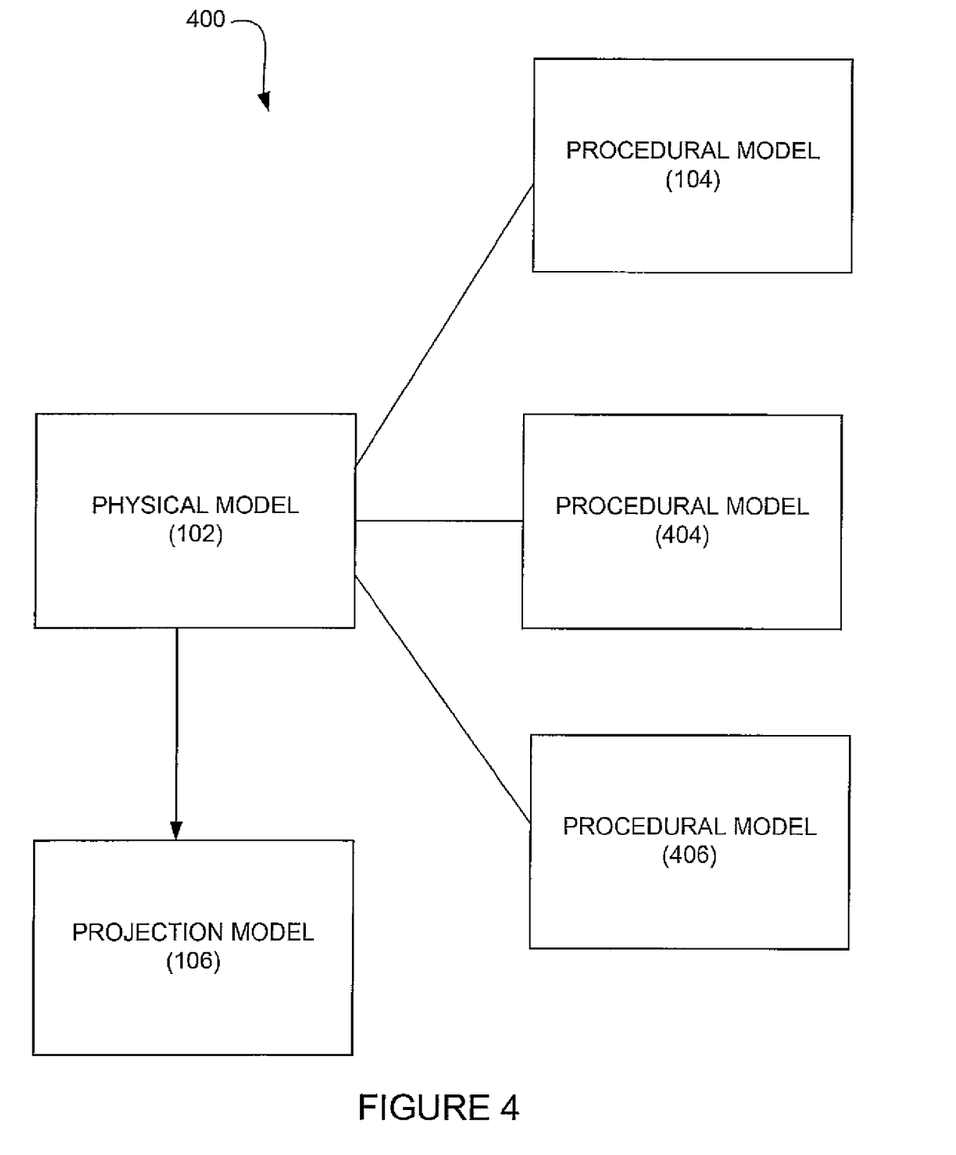
FIG. 4 illustrates an example reference model for production plants that uses multiple procedural models according to this disclosure.
Figure 5:
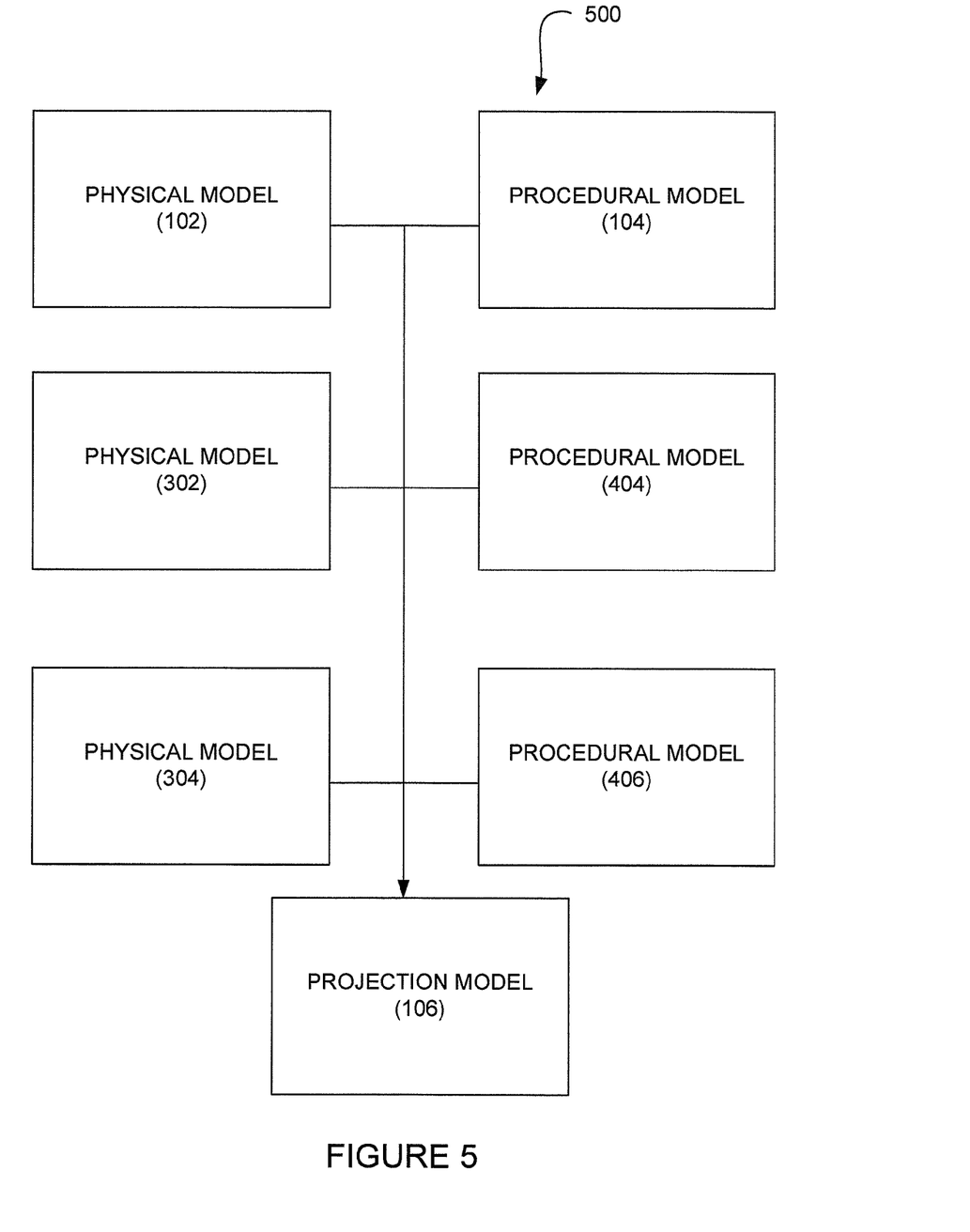
FIG. 5 illustrates an example reference model for production plants that uses multiple procedural models and multiple physical models according to this disclosure.

One of the innovative elements of this disclosure is that a plurality of models may be used to determine a projection model based upon multiple constraints. For instance, a physical model may be selected from multiple physical models based upon availability of material. A procedural model may be selected from multiple procedural models based upon constraints such as time to produce and cost. FIGS. 3 through 5 illustrate this relationship.

FIG. 3 illustrates an example reference model 300 for production plants that uses multiple physical models according to this disclosure. This reference model 300 includes multiple physical models 102, 302, 304 used in conjunction with the procedural model 104 to generate the projection model 106. A physical model may be selected that reflects the boundary condition needed in the physical domain. By selecting a physical model that corresponds to a particular boundary condition, the required boundary condition may be satisfied.

FIG. 4 illustrates an example reference model 400 for production plants that uses multiple procedural models according to this disclosure. This reference model 400 includes multiple procedural models 104, 404, 406 used in conjunction with the physical model 102 to generate the projection model 106. A procedural model may be selected that reflects the boundary condition needed in the procedural domain. By selecting a procedural model that corresponds to a particular boundary condition, the required boundary condition may be satisfied.

FIG. 5 illustrates an example reference model 500 for production plants that uses multiple procedural models and multiple physical models according to this disclosure. This reference model 500 includes multiple procedural models 104, 404, 406 used in conjunction with multiple physical models 102, 302, 304 to generate the projection model 106. A procedural model may be selected that reflects the boundary condition needed in the procedural domain. A physical model may be selected that reflects the boundary condition needed in the physical domain. By selecting both a procedural model that corresponds to a particular boundary condition and a physical model that corresponds to a particular boundary condition, the required boundary conditions may be satisfied.

Figure 6:
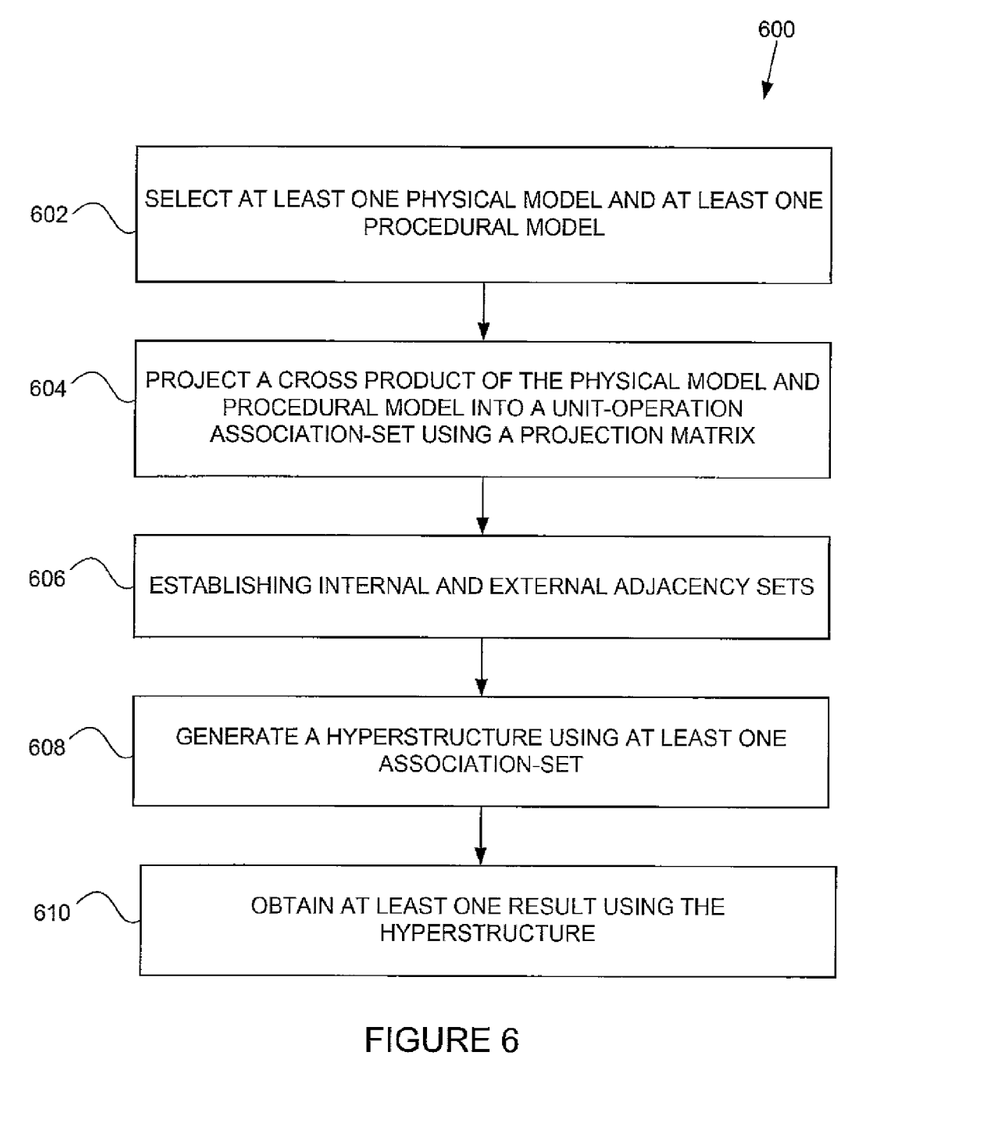
FIG. 6 illustrates an example method for using a reference model for production plants according to this disclosure.

FIG. 6 illustrates an example method 600 for using a reference model for production plants according to this disclosure. In block 602, there is a selection of at least one physical model 102 and at least one procedural model 104. In block 604, there is a projection of the cross-product of the physical model(s) 102 and procedural model(s) 104 into at least one unit-operation association set using a projection matrix 106. In block 606, there is an establishment of internal and external adjacency sets. In block 608, there is a generation of a hyperstructure using at least one of the association sets. In block 610, there is a result obtained from the hyperstructure.

Figure 7:
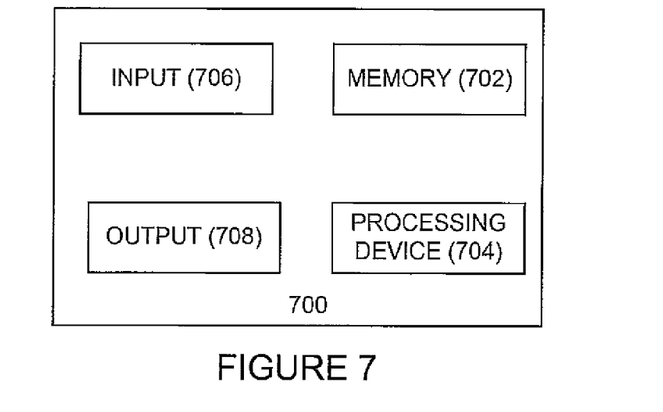
FIG. 7 illustrates an example processing system according to this disclosure.

FIG. 7 illustrates an example processing system 700 according to this disclosure. The system 700 includes at least one memory 702, at least one processing device 704, at least one input 706, and at least one output 708 that are configured to implement the disclosed systems and methods. In some embodiment, the input 706 obtains information elements relating to multiple atomic parts. The processing device 704 creates a projectional model 106 of the atomic parts in the memory 702 based upon the physical and procedural characteristics of the atomic parts, and the output 708 is configured to alter the operation of at least one of the atomic parts based upon the projectional model 106. In these or other embodiments, the input 706 can also be configured to poll devices within equipment, multiple pieces of equipment, or multiple facilities to obtain information relating to the atomic elements of the equipment. The atomic elements can relate to equipment physically located at one or multiple locations. When multiple locations are polled, factors such as transportation, time, and cost may be altered based upon the location of the equipment.

Although the figures above illustrate specific systems, structures, and methods, various changes may be made to the figures. For example, various components in the systems and structures can be combined, omitted, further subdivided, or moved according to particular needs. Also, while shown as a series of steps, various steps in FIG. 6 could overlap, occur in parallel, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    selecting a physical model and a procedural model associated with an industrial plant;
    projecting, using at least one processing device, a cross-product of the physical model and the procedural model into a unit-operation association set using a projection matrix, the unit-operation association set associating (i) units representing equipment in the industrial plant and (ii) operations representing processes performed in the industrial plant;
    establishing, using the at least one processing device, internal and external adjacency sets within structures, the internal adjacency set identifying connections between inputs and outputs of individual units and operations, the external adjacency set identifying connections between (i) outputs of some units and operations and (ii) inputs of other units and operations; and
    generating, using the at least one processing device, a hyperstructure representing the industrial plant using the association and adjacency sets; and
    using the hyperstructure to control the industrial plant.

2. The method of claim 1, wherein each of the physical and procedural models comprises multiple atomic units.

3. The method of claim 2, wherein the atomic units comprise units, operations, ports and states.

4. The method of claim 1, wherein the physical model is selected from multiple physical models to satisfy at least one physical constraint.

5. The method of claim 4, wherein the procedural model is selected from multiple procedural models to satisfy at least one procedural constraint after the at least one physical constraint is satisfied.

6. The method of claim 1, wherein the procedural model is selected from multiple procedural models to satisfy at least one procedural constraint.

7. The method of claim 6, wherein the physical model is selected from multiple physical models to satisfy at least one physical constraint after the at least one procedural constraint is satisfied.

8. A system comprising:
    at least one memory configured to store information related to multiple atomic units associated with an industrial process; and
    at least one processing device configured to (i) select a physical model and a procedural model associated with the industrial plant, (ii) apply the atomic units to the physical model and the procedural model, (iii) project a cross-product of the physical model and the procedural model into a unit-operation association set using a projection matrix, (iv) establish internal and external adjacency sets, and (v) generate a hyperstructure representing the industrial plant using the association and adjacency sets;
    wherein:
        the unit-operation association set associates (i) units representing equipment in the industrial plant and (ii) operations representing processes performed in the industrial plant;
        the internal adjacency set identifies connections between inputs and outputs of individual units and operations; and
        the external adjacency set identifies connections between (i) outputs of some units and operations and (ii) of other units and operations;
    wherein the at least one processing device is further configured to use the hyperstructure to control the industrial plant.

9. The system of claim 8, wherein the atomic units comprise units, operations, ports and states.

10. The system of claim 8, wherein the physical model is selected from multiple physical models to satisfy at least one physical constraint.

11. The system of claim 10, wherein the procedural model is selected from multiple procedural models to satisfy at least one procedural constraint after the at least one physical constraint is satisfied.

12. The system of claim 8, wherein the procedural model is selected from multiple procedural models to satisfy at least one procedural constraint.

13. The system of claim 12, wherein the physical model is selected from multiple physical models to satisfy at least one physical constraint after the at least one procedural constraint is satisfied.

14. An apparatus comprising:
    at least one input configured to obtain multiple information elements relating to atomic parts of an industrial plant;
    at least one processing device configured to create a projectional model using the atomic parts based upon physical and procedural characteristics of the industrial plant; and
    at least one output configured to provide instructions relating to operation of at least one of the atomic parts based upon the projectional model;
    wherein, in order to create the projectional model, the at least one processing device is configured to:
        project a cross-product of a physical model defining the physical characteristics of the industrial plant and a procedural model defining the procedural characteristics of the industrial plant into a unit-operation association set using a projection matrix, the unit-operation association set associating (i) units representing equipment in the industrial plant and (ii) operations representing processes performed in the industrial plant;
        establish internal and external adjacency sets within structures, the internal adjacency set identifying connections between inputs and outputs of individual units and operations, the external adjacency set identifying connections between (i) outputs of some units and operations and (ii) inputs of other units and operations; and generate a hyperstructure representing using the association and adjacency sets.

15. The apparatus of claim 14, wherein the at least one output is further configured to alter the operation of at least one of the atomic parts.

16. The apparatus of claim 14, wherein the at least one input is configured to obtain the information elements from at least one memory.

17. The apparatus of claim 14, wherein the at least one processing device is further configured to identify the atomic parts by polling available hardware in the industrial plant.

18. The apparatus of claim 14, wherein the at least one processing device is further configured to select the physical model based on at least one physical constraint and to select the procedural model based on at least one procedural constraint.

* * * * *